(12) United States Patent
Barthelet et al.

(10) Patent No.: US 9,396,583 B2
(45) Date of Patent: Jul. 19, 2016

(54) METHOD OF MODELLING BUILDINGS ON THE BASIS OF A GEOREFERENCED IMAGE

(75) Inventors: Edouard Barthelet, Velizy (FR); Christian Louis, Velizy (FR); Sébastien Reynaud, Velizy (FR); Léonard Denise, Velizy Cedex (FR)

(73) Assignee: Thales, Courbevoie (FR)

( * ) Notice: Subject to any disclaimer, the term of this patent is extended or adjusted under 35 U.S.C. 154(b) by 381 days.

(21) Appl. No.: 13/554,537

(22) Filed: Jul. 20, 2012

(65) Prior Publication Data

US 2013/0191082 A1  Jul. 25, 2013

(30) Foreign Application Priority Data

Jul. 22, 2011  (FR) ..................................... 11 02288
Jul. 22, 2011  (FR) ..................................... 11 02289

(51) Int. Cl.
*G06T 7/00* (2006.01)
*G06T 17/00* (2006.01)
*G06K 9/00* (2006.01)
*G06T 17/05* (2011.01)

(52) U.S. Cl.
CPC ............ *G06T 17/00* (2013.01); *G06K 9/00637* (2013.01); *G06T 7/0046* (2013.01); *G06T 17/05* (2013.01); *G06T 7/004* (2013.01); *G06T 7/0053* (2013.01)

(58) Field of Classification Search
None
See application file for complete search history.

(56) References Cited

U.S. PATENT DOCUMENTS

| 5,694,590 | A  | * | 12/1997 | Thuraisingham | ....... | G06F 21/55 |
| 5,821,943 | A  | * | 10/1998 | Shashua | ................ | G06T 7/0022 345/419 |
| 6,694,064 | B1 | * | 2/2004  | Benkelman | .......... | G06K 9/0063 348/144 |
| 7,733,342 | B2 |   | 6/2010  | Kim et al. | | |
| 7,809,191 | B2 | * | 10/2010 | Furukado | .............. | G06T 7/0042 348/143 |
| 7,961,982 | B2 |   | 6/2011  | Sibiryakov et al. | | |
| 8,437,554 | B2 | * | 5/2013  | Kim | ...................... | G06T 7/0053 348/135 |
| 2003/0088387 | A1 | * | 5/2003 | Chang | ............... | G06F 17/30259 702/196 |
| 2004/0096102 | A1 | * | 5/2004 | Handley | ........................ | 382/164 |

(Continued)

FOREIGN PATENT DOCUMENTS

EP    1 998 139 A1    12/2008

OTHER PUBLICATIONS

H. Sportouche, & F. Tupin, "A Processing Chain for Simple 3D Reconstruction of Buildings in Urban Scenes From High Resolution Optical and SAR Images", EUSAR 2010, pp. 1022-1025.*

(Continued)

*Primary Examiner* — Kibrom K Gebresilassie
(74) *Attorney, Agent, or Firm* — Baker & Hostetler LLP (57) ABSTRACT

A method of modelling real objects represented in an image of the terrestrial surface, in particular buildings, on the basis of a geographically referenced image, the image being produced by an aerial or space sensor associated with a physical picture-capture model, comprises at least the following steps: choosing a parametric model of the external surface of the said real object; for several suites of parameters of the said model: projecting the parametrized model into the image by applying the physical picture-capture model, and evaluating the fit between the projected model and the radiometric characteristics of the image; and determining the parameters of the model for which the fit is the best so as to model the said object with these parameters. The method of modelling applies notably to teledetection, digital geography, to the construction of urban 3D databases or their updating.

12 Claims, 5 Drawing Sheets

(56) References Cited

U.S. PATENT DOCUMENTS

| | | | | |
|---|---|---|---|---|
| 2005/0147324 | A1* | 7/2005 | Kwoh et al. | 382/293 |
| 2006/0020789 | A1* | 1/2006 | Gipps et al. | 713/167 |
| 2006/0228019 | A1* | 10/2006 | Rahmes et al. | 382/154 |
| 2007/0115284 | A1 | 5/2007 | Kim et al. | |
| 2008/0152234 | A1* | 6/2008 | Feldman | 382/212 |
| 2008/0279447 | A1* | 11/2008 | Friedlander et al. | 382/154 |
| 2009/0099774 | A1* | 4/2009 | Takac et al. | 701/216 |
| 2009/0262075 | A1* | 10/2009 | Kimmel et al. | 345/163 |
| 2009/0262260 | A1* | 10/2009 | Jaynes et al. | 348/744 |
| 2009/0284555 | A1* | 11/2009 | Webb et al. | 345/690 |
| 2010/0085371 | A1* | 4/2010 | Wexler et al. | 345/582 |
| 2010/0254612 | A1* | 10/2010 | Oldroyd | 382/209 |
| 2011/0222777 | A1* | 9/2011 | Larsen et al. | 382/190 |
| 2012/0114185 | A1* | 5/2012 | Ram et al. | 382/110 |
| 2012/0147198 | A1* | 6/2012 | Matsushita | H04N 5/2178 348/187 |
| 2012/0314030 | A1* | 12/2012 | Datta et al. | 348/44 |
| 2013/0182103 | A1* | 7/2013 | Lee et al. | 348/139 |

OTHER PUBLICATIONS

G. Mercier, G. Moser, and S. Serpico, "Conditional Copulas for Change Detection in Heterogeneous Remote Sensing Images", pp. 1428-1441, IEEE 2008.*

H. Sportouche, & F. Tupin, "A Processing Chain for Simple 3D Reconstruction of Buildings in Urban Scenes From High Resolution Optical and SAR Images", EUSAR 2010.*

D. Brunner, G. Lemoine, L. Bruzzone "Earthquake Damage Assessment of Buildings Using VHR Optical and SAR Imagery", pp. 2403-2420, IEEE 2010.*

Dominik Brunner et al., "Earthquake Damage Assessment of Buildings Using VHR Optical and SAR Imagery", IEEE Transactions on Geoscience and Remote Sensing, May 1, 2010, pp. 2403-2420, vol. 48, No. 5, IEEE Service Center, Piscataway, NJ, USA, XP011302719.

Dominik Brunner, et al., "Building Height Retrieval From VHR SAR Imagery Based on a n Interactive Simulation and Matching Technique", IEEE Transactions on Geoscience and Remote Sensing, Mar. 1, 2010, pp. 1487-1504, vol. 48, No. 3, IEEE Service Center, Piscataway, NJ, USA, XP011297498.

H. Sportouche, et al., "Building Detection and Height Retrieval in Urban Areas in the Framework of High Resolution Optical and SAR Data Fusion", 2010 IEEE International Geoscience and Remote Sensing Symposium, Jul. 25, 2010, pp. 3660-3663, IEEE, Piscataway, NJ, USA, XP031810790.

Florent Lafarge, et al, "Structural Approach for Building Reconstruction from a Single DSM", IEEE Transactions on Pattern Analysis and Machine Intelligence, Jan. 1, 2010, pp. 135-147, vol. 30, No. 1, IEEE Service Center, Los Alamitos, CA, USA, XP011292928.

I.J. Dowman, et al., "Automatic registration of Images with Maps Using Polygonal Features", International Archives of Photogrammetry and Remote Sensing, 1996, pp. 139-145, vol. XXXI, No. B3, XP002669199.

Ildiko Suveg, et al., "Reconstructionof 3D Building Models from Aerial Images and Maps", ISPRS Journal of Photogrammetry and Remote Sensing, Jan. 1, 2004, pp. 202-224, vol. 58, No. 3-4, Elsevier, Amsterdam, NL, XP027189325.

Helene Sportouche, "Extraction et reconstruction Des Bâtiments en Milieu Urbain à Partir D'Images Satellitaires Optiques et Radar à Haute Résolution", in: "These de Doctorat", Dec. 10, 2010, Telecom ParisTech, pp. 72-77, p. 92 and 99.

Wang, Lu et al. "A Robust Approach for Automatic Registration of Aerial Images with Untextured Aerial LiDAR Data", Computer Graphics and Immersive Technologies Laboratory, University of Southern California, pp. 2623-2630, 2009.

Wong, Alexander et al. "ARRSI: Automatic Registration of Remote-Sensing Images", IEEE Transactions on Geoscience and Remote Sensing, vol. 45, No. 5, May 2007, pp. 1483-1493.

Ali Mohamed A. et al. "Automatic Registration of SAR and Visible Band Remote Sensing Images", Systems Design Engineering, University of Waterloo, pp. 1331-1333, 2002.

Sportouche, Helene et al. "A Processing Chain for Simple 3D Reconstruction of Buildings in Urban Scenes from High Resolution Optical and SAR Images", (1) Institut Telecom; Telecom ParisTech; CNRS LTC1; TSI Department (2) Thales Communications; Land and Joint Systems; IMINT Department; Jun. 7, 2010.

European Search Report issued Oct. 17, 2014 in EP Application No. 12 17 7362.

Mercier, Gregoire et al., "Conditional Copulas for Change Detection in Heterogeneous Remote Sensing Images" IEEE Transactions on Geoscience and Remote Sensing, vol. 46, No. 5, May 2008, pp. 1428-1441.

* cited by examiner

METHOD OF MODELLING BUILDINGS ON THE BASIS OF A GEOREFERENCED IMAGE

CROSS-REFERENCE TO RELATED APPLICATIONS

This application claims priority to foreign French patent application No. FR 1102288, filed on Jul. 22, 2011, and foreign French patent application No. FR 1102289, filed on Jul. 22, 2011, the disclosures of which are incorporated by reference in their entireties.

FIELD OF THE INVENTION

The present invention relates to a method of modelling real objects, in particular buildings, on the basis of a geographically referenced image. It applies notably to teledetection, digital geography, to the construction of urban 3D databases or their updating.

BACKGROUND

The devising of a 3D database for modelling an urban zone generally involves a phase of manual or automatic extraction of the framework on the basis of one or more aerial or space images of the zone to be modelled. The images used for this modelling can emanate from diverse observation sensors: a conventional photographic apparatus, an image sensor onboard an aircraft or an observation satellite. Furthermore, the picture-capture spectral domain can vary: domain of visible light, infrared, multispectral or hyperspectral, radar, lidar, for example. Moreover, the images are geographically referenced, stated otherwise georeferenced, that is to say they are associated with metadata comprising a correspondence function matching the observed terrestrial surface, the space designated by the expression "terrain space", and the pixels of the image, the space designated by the expression "image space". This function, denoted $f_{\theta_1, \ldots, \theta_n}(X,Y,Z)$, is a portrayal of the physical characteristics of the sensor used for picture-capture; it thus matches the geographical coordinates of any point of the observed zone with a corresponding pixel of the image. Stated otherwise, it is a parametric model whose parameters $\theta_1, \ldots, \theta_n$ comprise at least the physical characteristics of the sensor (size of receptor matrices, focal length if relevant, etc.) and the position and the orientation of the sensor at the moment of picture-capture: this function is then called a physical model of the picture-capture. These types of model are for example:

- the conical model representing the conventional picture-capture of a photographic apparatus with focal plane: it corresponds to a matrix of receptors (CCD for Charge-Coupled Device, or CMOS for Complementary metal oxide semi-conductor);
- the "pushbroom" model where the receptors are organized along a unidimensional strip;
- the "Whiskbroom" model where the receptor is reduced to a cell whose fast motion makes it possible to form an image;
- the "SAR" (Synthetic Aperture Radar) model emanating from a mathematical post-processing by the SAR processor of the electromagnetic reflections of an incident radar signal in a given frequency band.

In other cases, this function may amount to a very general mathematical function which, most of the time, has properties of a universal approximator whose parameters do not have any particular physical meaning. One then speaks of a replacement model. Prevalent examples of these types of model are:

- Polynomial models,
- RPC models which are quotients of polynomials (Rational Polynom Coefficients)
- "Grid" models where the function is piecewise linear by interpolation of the values at the nodes of a grid.

It is possible to separate the schemes for extracting buildings into two major categories: the stereoscopy technique, in which several georeferenced images emanating from different viewpoints are used jointly to extract the relief, and the monoscopy technique, which relies, on the one hand, on a single image assigned an angle of parallax making it possible to reconstruct the height of the objects represented, and on the other hand on the altitude datum for the object considered, which is generally provided by a model M of the terrestrial surface which contains, for any point P of the terrain, the altimetric coordinate Z as a function of the planimetric coordinates X and Y. It is expressed in the following manner: $Z=M(X,Y)$, where Z is the altimetric coordinate of a point P of the terrain; and X and Y are the planimetric coordinates of this point P. The model M of the terrestrial surface is for example a digital surface model (DSM) or a digital elevation model (DEM), these two models giving relief information relating to what is above ground. As a variant, this entails a digital terrain model (DTM) which gives relief information relating to the bare ground.

Extraction in monoscopy may be carried out manually, automatically or according to a combination of manual actions and of automated methods. When extraction is manual, display means, for example a screen, are used to allow an operator to input the buildings directly on these display means with the aid of a mouse or similar means. As a general rule, this input makes it possible to obtain models of good quality on optical images, but it turns out to be irksome and expensive. Moreover, certain types of images such as images of SAR type (the acronym standing for "Synthetic Aperture Radar") are very difficult for a human operator to interpret, which complicates the input of buildings, requires operators trained specifically for this type of image, and consequently increases the modelling costs.

Certain automatic techniques have been proposed in order to accelerate extraction. It is possible to cite notably the scheme described in the American patent published under the number U.S. Pat. No. 7,733,342. This scheme utilizes the shadows cast by buildings to deduce their height therefrom. However, this scheme comprises several limits. On the one hand, it makes it possible to determine only the height of a building, and does not therefore solve the problem of determining its footprint. Moreover, this scheme is contingent on the picture-capture conditions and notably on the presence of sufficient illumination to create shadows. Moreover, it operates only with optical images, and does not therefore allow extraction on the basis of images of SAR type.

Other techniques are based on the prior extraction of elementary primitives such as segments. Once a set of segments has been constructed, algorithms for reconstructing the objects are executed so as to associate the segments with one another and thus form the buildings. However, these techniques are prone to numerous errors, notably because of the imperfections in the detections of contours. They require complex parametrization involving numerous thresholds to be fixed prior to the execution of the algorithm. Furthermore, a suite of parameters culminating in results that are satisfactory for a given image may turn out to be totally unsuited to other images; this problem is further heightened for images of SAR type. Consequently, these algorithms based on segmentation lack robustness.

A scheme disclosed by Dominik Brunner et al., entitled "Earthquake Damage Assessment of Buildings Using VHR Optical and SAR Imagery", and published in IEEE Geoscience and Remote Sensing Society, vol. 48, no. 5, May 2010, proposes to extract buildings from an SAR image. It makes it possible to determine the height of the building by utilizing both the SAR image and an already known building model. This scheme does not make it possible to automatically determine all the parameters characterizing a building in the image, but only a single parameter (the height) on the basis of a first model already extracted beforehand.

SUMMARY OF THE INVENTION

An aim of the invention is to propose a robust and at least partially automated scheme for monoscopic extraction of one or more objects present on the terrestrial surface and included in an image emanating from a picture-capture by an aerial or space sensor. For this purpose, the subject of the invention is a method of modelling a real object represented in an image of the terrestrial surface, the image being referenced geographically and produced by an aerial or space sensor associated with a physical picture-capture model, wherein the method comprises at least the following steps:

choosing a parametric model of the external surface of the said real object (101);

choosing (102) several initial suites of parameters of the said model and for each of the said initial suites of parameters:

projecting (103) the parametrized model into the image by applying the physical picture-capture model;

evaluating, according to predefined radiometric criteria, the fit (104) between the projected model and the image;

as long as the fit is not optimal, modifying the parameters by an optimization scheme utilizing the said criteria, and repeating, with the said parameters modified by optimization, the method from the step (103) of projecting the model, until the optimal suite of parameters emanating from the said initial suite of parameters is found;

determining, from among the said optimal suites of parameters determined, the parameters of the model for which the fit is the best (106), so as to model the said object with these parameters.

The modelling method according to the invention makes it possible to jointly determine all the descriptive parameters of the object in a reasonable time, by virtue in particular of the combination between the application of an optimization scheme on the basis of a suite of parameters chosen from among a plurality of suites of parameters initialized for example randomly. Thus, the method according to the invention utilizes a double iteration, the first iteration fixing an initial suite of parameters used as starting point by the optimization scheme, which participates in a second iteration to determine the optimal local suite of parameters as quickly as possible.

In contradistinction to the conventional schemes which attempt to reconstruct objects, for example buildings, on the basis of the extraction of low-level primitives such as segments for example, the method according to the invention proceeds according to an assumption-refutation mode, starting from high-level primitives, that is to say from models representing real objects such as buildings. The method according to the invention thus makes it possible to limit the errors often encountered in conventional schemes, prone to noise, to the nature of the image, to the radiometric characteristics of the image itself, and to the parametrization of the scheme. The method according to the invention does not require the definition of a multitude of thresholds, which is particularly difficult to tailor, and whose optimal values generally depend on the image to be processed.

According to an implementation of the modelling method according to the invention, as long as the parameters corresponding to the best fit between the projected model and the image have not been determined, the parameters are modified, the parametrized model is projected into the image space, and the fit between the projected model and the radiometric characteristics of the image is re-evaluated. The first tested suite of parameters may be randomly drawn.

According to an implementation of the modelling method according to the invention, each of the parameters is randomly drawn according to a law which is uniform in its domain of definition.

The application of a random draw in order to choose an initial suite of parameters makes it possible to cover the whole of the domain of definition and thus avoid modelling the object on the basis of a parameter suite corresponding only to a local optimum.

According to an implementation of the modelling method according to the invention, during the step of evaluating the fit between the projected model and the image, the radiometric homogeneity of the zones corresponding to the faces of the model projected into the image is evaluated. This step makes it possible to take account of the fact that as a general rule, a building face viewed from an aerial or space sensor is relatively homogeneous and is radiometrically differentiated from the other faces of this building.

According to an implementation of the modelling method according to the invention, during the step of evaluating the fit between the projected model and the image, the fit of the contours of the model projected into the image with the radiometric transitions of the image is evaluated. This step makes it possible to utilize the relatively precise character of the representation of the contours of buildings in the image.

According to an implementation of the modelling method according to the invention, firstly, the initial parameters are modified until an optimal fit is obtained between the radiometric homogeneity of the zones corresponding to the faces of the model projected into the image, and secondly, the parameters leading to the said optimal fit of radiometric homogeneity are modified until an optimal fit is obtained for the contours of the model projected into the image with the radiometric transitions of the image. This two-stage scheme makes it possible to closely approximate the optimal parameter suite using the less precise but smoother radiometric homogeneity criterion, and then to precisely determine the optimal parameters using the more irregular but more precise criterion based on contours.

According to an implementation of the modelling method according to the invention, the criteria for evaluating the fit between the projected model and the image are chosen as a function of the type of sensor used to produce the image. The adaptation of the pairing criteria to the various types of image makes it possible to apply the method equally to all the image types for which criteria have been defined beforehand.

According to an implementation of the modelling method according to the invention, the real object to be modelled is a building, the modelling parameters comprising at least one parameter from among the following: the length of the building, the width of the building, the height of the building, the longitude of the centre of gravity of the footprint of the building, the latitude of the centre of gravity of the footprint of the building, the azimuth angle of orientation of the building with respect to geographical North. Each of these parameters is associated with its own specific domain of definition.

According to an implementation of the modelling method according to the invention, the altitude of the model of the real object to be projected is, before the projection step, considered to be at the level of a digital model of the terrain corresponding to the geographical zone observed in the image. This constraint makes it possible to predetermine the altitude component.

According to an implementation of the modelling method according to the invention in which the image emanates from an optical sensor, the instant at which the image was captured being known, the shape of the shadow produced by the parametrized model of the real object is modelled,
the shadow of this model is projected into the image using data of ephemerides corresponding to the instant at which the image was captured,
the fit of the shadow with the radiometric characteristics of the image is evaluated.

The subject of the invention is also a method of modelling several real objects represented in a geographically referenced image of the terrestrial surface, the image being produced by an aerial or space sensor, in which the step of choosing the parametric model is executed as described above, and then in which several distinct domains of definition are defined, for a subset of parameters, before executing the steps as described above of projection, of evaluating the fit between the projected model and the image, and of determining the optimal parameters on each of the previously defined domains of definition.

According to an implementation of the modelling method according to the invention, the method being implemented by software executed on a calculation system provided with means of display and of interaction with a user, in which, after the step as described above of choosing the parametric model, a user defines, by using the interaction means, a domain of definition for a subset of parameters, before executing the steps of projection, of evaluating the fit between the projected model and the image, and of determining the optimal parameters over the domain of definition defined previously by the user.

The subject of the invention is also a method for detecting changes between two images of one and the same geographical zone captured at two different instants, the method comprising a first step of executing the modelling method independently on each of the two images, and a second step of comparing the models obtained on completion of the first step.

The subject of the invention is also a system for modelling a real object represented in an image of the terrestrial surface, the image being referenced geographically and produced by an aerial or space sensor, wherein the system comprises at least one calculation machine configured so as to execute the modelling method such as described above.

The subject of the invention is also a method for extracting at least one group of N homologous points on the basis of N aerial or space images referenced geographically in an approximate manner, N≥2, the images representing one and the same zone of the terrestrial surface, the homologous points of one and the same group corresponding to one and the same geographical point in the said zone, each of the homologous points of the said group being defined by coordinates in a different image from that of the other homologous points of the same group, wherein the method comprises the following steps:

for each of the N images, modelling with the modelling method such as described above the external surface of K real objects represented in the image, K≥1;
selecting from among the said K objects, the Q objects, Q≤K, for each of which the N models created during the modelling step are a distance away of less than a predetermined level,
for each of the said Q objects, choosing at least one point in each of the N models of this object, and determining in each of the N images the coordinates corresponding to the chosen points, the set of the said coordinates forming one of the said groups of N homologous points.

Advantageously, the modelling of the external surface of the real objects on an image is performed independently of the other images. The point or points chosen in each of the models are preferably taken on the modelled surface. Before choosing these points, the models may be matched; for example, this match may be determined by considering the minimum transformation to be performed so as to pass from one model to the other. In contradistinction to the schemes conventionally used in the prior art, the method according to the invention does not use low-level primitives, such as points or segments, to perform pairings. It relies on more complex primitives, thus limiting the risk of erroneous pairings between two objects that do not correspond to one and the same object of the terrain.

Comparison between images is avoided, thereby making it possible notably to avoid the snag of comparisons between images of different natures, which comparisons are doomed to failure.

According to an implementation of the method for extracting homologous points according to the invention, the external surface of the objects is modelled in three dimensions by means of edges and vertices, for each of the said Q objects emanating from the step of selecting the objects, the homologous points are chosen from among the said vertices.

According to an implementation of the method for extracting homologous points according to the invention, a first model of one of the modelled real objects being generated on the basis of a first image, a second model of this same object being generated on the basis of a second image, a step of matching the vertices of each of the two models is executed prior to the step of choosing the homologous points.

According to an implementation of the method for extracting homologous points according to the invention, the real objects modelled are buildings, each of the buildings is modelled by a polygon extruded along the altitude axis.

Advantageously, the homologous points may be chosen from among the vertices of the upper polygon modelling the roof of the building.

According to an implementation of the method for extracting homologous points according to the invention, a first model of one of the modelled real objects is generated on the basis of a first image, a second model of this same object being generated on the basis of a second image, the distance between these two models, which is used by the step of selecting the objects, is determined at least as a function of the similarity between the polygon at the base of the extrusion of the first model and the polygon at the base of the extrusion of the second model.

According to an implementation of the method for extracting homologous points according to the invention, the step of modelling the objects is performed, for at least one image, and for at least one object, manually by an operator by means of an input using a pointer on display means.

The subject of the invention is also a method for correcting picture-capture models associated with images, in which each image is produced by an aerial or space sensor associated with a physical picture-capture model, the method comprising the execution of the method for extracting homologous points as described above, and then a step of correcting the said picture-capture models as a function of the groups of homologous points extracted.

The subject of the invention is also a system for registering images, wherein it comprises a calculation machine configured to execute the method for extracting homologous points as described above. The method can for example be implemented by software executed on a computer.

BRIEF DESCRIPTION OF THE DRAWINGS

Other characteristics will become apparent on reading the nonlimiting detailed description given by way of example which follows offered in relation to appended drawings which represent.

DETAILED DESCRIPTION

The examples presented subsequently are applied to the modelling of buildings, but the method according to the invention may be applied to the modelling of any real object whose dimensions are significant enough to appear on the image.

Figure 1:
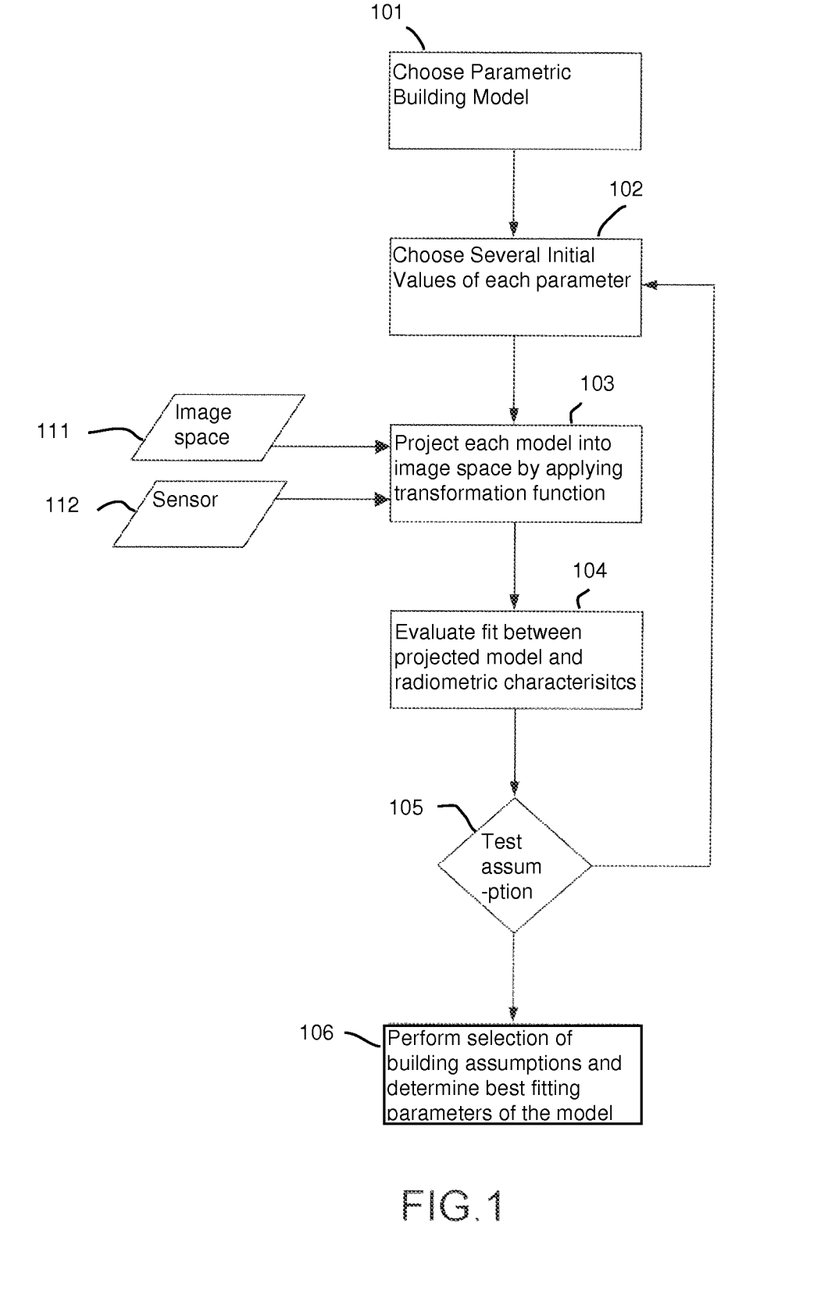
FIG. 1, a diagram illustrating the steps of a first implementation of the modelling method according to the invention.

FIG. 1 illustrates the steps of a first implementation of the modelling method according to the invention. The method is executed on a georeferenced image emanating from a sensor onboard an aircraft or a satellite. The picture-capture model of the georeferenced image may be represented by a parametrized function, denoted $f_{\theta_1,\ldots,\theta_n}(X,Y,Z)$, matching up a 3D coordinate of the terrain space with a corresponding 2D coordinate on the image:

$$f_{(\theta,\ldots,\theta_n)}(X_{terrain}, Y_{terrain}, Z_{terrain}) = (\text{column}_{image}, \text{row}_{image})$$

where the parameters $\theta_1, \ldots, \theta_n$ depend on the physical characteristics of the sensor.

The method may be executed only if the image is not orthorectified, stated otherwise, if the function f satisfies that $$\frac{\partial f_{(\theta,\ldots,\theta_n)}}{\partial Z}$$

is not identically zero.

The method may be executed on a calculation machine such as a computer.

According to a first step 101, making the assumption that a building is sought whose approximate shape is known, a parametric building model is chosen. This model corresponds to a set of N parameters making it possible to define the external surface of the building sought. This set of parameters—whose values have to be determined by the method according to the invention—thus defines a set of "virtual" buildings for which one seeks to determine whether they are actually present in the image.

For example the external surface of a parallelepipedal shaped building may be defined by the following parameters: the latitude of the centre of gravity of the footprint of the building, the longitude of the centre of gravity of the footprint of the building, the angle of orientation of the building with respect to geographical North, the width of the building, the length of the building, the height of the building. Another suite of parameters will be used to define the buildings provided with a pitched roof for example. In the example, the altitude of the building is known in advance since it is considered that a digital terrain model (DTM) is available for the modelling zone. The building is thus presumed to be constructed at the altitude corresponding to the level of the DTM at the latitude and longitude considered. The method according to the invention makes it possible to determine the value of each of these parameters.

According to a second step 102, the parameters are fixed at certain values. Stated otherwise, a building assumption is chosen. Each parameter can take a value in a predefined span (domain of definition). For example, the latitude and the longitude are restricted to the geographical zone in which the building is sought. Thus, during the second step 102, the value of each parameter is chosen in its domain of definition, which is established beforehand, preferably as a function of a priori knowledge of the terrain. In the cases where the value of a parameter is already known, the domain of definition corresponding to this parameter is restricted to this value alone. This makes it possible to reduce the space of possibilities and thus to converge more rapidly to the apposite assumptions.

In the particular case where all the parameters of the building model are fixed, the execution of the method amounts to performing a test to determine whether a building whose shape is known in advance is indeed present in the image at the envisaged location.

Advantageously, a stochastic scheme is applied: possible candidates are chosen at random from among all the admissible buildings by choosing the parameters according to a law which is uniform in their domain of definition. Hence, during the second step 102, a random draw is performed according to uniform laws of the parameters of the building model sought. As explained further on during the fourth step 104, this random draw forms part of a heuristic aimed at restricting the space of building assumptions to be tested.

Thereafter, during the subsequent executions of the second step 102, these parameters are locally optimized as a function of criteria regarding the fit of the assumption to the image (cf. fourth step 104).

In a third step 103, the building assumption chosen during the second step 102 is projected into the image space 111 by applying the transformation function $f_{\theta_1, \ldots, \theta_n}$ specific to the picture-capture sensor 112. Stated otherwise, the image coordinates of the building assumption are calculated. This operation makes it possible to "draw" in the image the building as if it had been imaged by the sensor if it had actually been present on the terrain at the moment of the capture of the image. The projection of the 3D model is performed in such a way that the hidden faces of the building are eliminated, the various regions corresponding to the faces of the building and to its shadow are labelled (for example the zones corresponding to the roof, to the walls are differentiated), and the "edges" of the image are identified (for example the double echo is differentiated from the simple echo).

In a fourth step 104, the fit of the building assumption projected into the image space with the radiometric characteristics of the image is evaluated, and then as long as the optimal local suite of parameters is not found, the parameters are modified and the model projected according to the fourth step 103. The method therefore executes an iterative loop in the main iteration included between the second step 102 and the fifth step 105.

In the implementation described, two criteria for evaluating this fit are taken into account. The first criterion quantifies the radiometric homogeneity of the various constituent regions of the assumption projected into the image space. The second criterion quantifies the fit of the contours of this projected assumption with the contours present in the image.

An exhaustive traversal of the set of possible assumptions would be very expensive in calculation time. In order to avoid too expensive a traversal of the space of 3D models, a heuristic has been implemented so as to obtain calculation times close to the operator real time. This heuristic is aimed at firstly optimizing the criteria based on the homogeneity of the regions, and then at refining the search with the criteria relating to the contours.

Let us denote by $P_I(b)$ the signature of the building on projecting the building b into the image I. The signature may be described in an equivalent manner by a set of regions or as a set of segments:

$$P_I(b) = \{R_i, i=1 \ldots N\} = \{S_j, j=1 \ldots M\}$$

The first criterion, denoted $C_{region}$, quantifies the spatial homogeneity of the regions of the signature by calculating on the basis of the sensor's characteristic noise model the generalized log-likelihood of the radiometric values of the pixels of these regions. The generalized log-likelihood of the radiometric values of the pixels inside a region $R_i$ can be written as follows under the assumption of statistical independence:

$$l_i = l(R_i \mid \vec{\Omega}_i) = \sum_{k \in R_i} \ln p(I(k) \mid \vec{\Omega}_i)$$

where I(k) is the radiometry of pixel k of the image I and p represents the statistical distribution of the noise of the image, a law entirely described by the parameter vector $\vec{\Omega}_i$ whose estimation is performed by likelihood maximization. The homogeneity criterion for the regions $C_{region}$ is then calculated as the sum of the generalized log-likelihoods of each of the regions of the signature:

$$C_{region}(P_I(b)) = l_0 + \sum_{i=1}^{N} l_i$$

where $l_0$ represents the generalized log-likelihood of a region $R_0$ which surrounds the building. The region $R_0$ may be defined as the encompassing box (encompassing image patch) of the set of projections of the buildings of the domain of definition considered a priori. $R_0$ is fixed.

The second criterion, denoted $C_{segment}$, considered in the local optimization based on the segment approach which consists in the calculation of the ratio $r(S_j)$ or difference $d(S_j)$ (depending on the nature, additive or multiplicative, of the noise of the images) of the median values of the radiometry inside neighbourhoods situated on each side of the segments $S_j$ of the signature. This criterion $C_{segment}$ is defined as the conjunction of the scores calculated for each segment, by way of a geometric mean as follows:

$$C_{segment}(P_I(b)) = \sqrt[M]{\prod_{j=1}^{M} r(S_j)}$$

in the case of multiplicative noise, $$C_{segment}(P_I(b)) = \sqrt[M]{\prod_{j=1}^{M} d(S_j)}$$

in the case of additive noise.

Advantageously, the modelling method according to the invention adapts this fourth step 104 as a function of the type of image processed so that the method can operate on all types of image. Hence, in the example, Gaussian additive noise is used in optical images and the gamma model is used in the case of SAR.

Figure 5A:
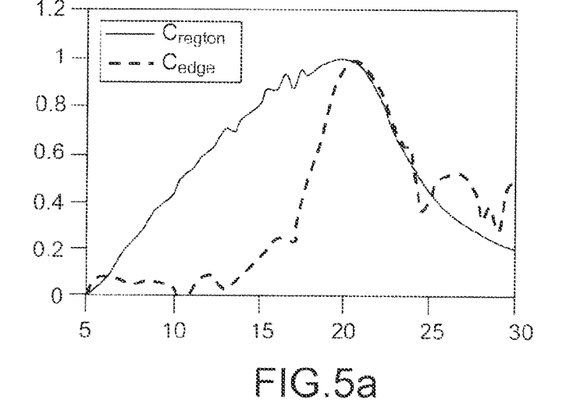
FIG. 5a, a graphic showing the evolution of the value of the fit criteria as a function of a parameter of the building model, for an optical image.
Figure 5B:
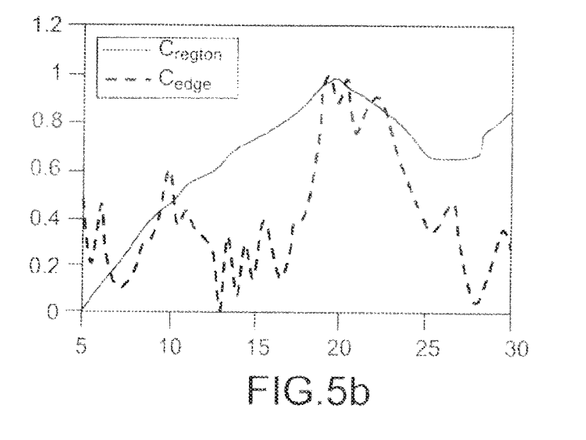
FIG. 5b, a graphic showing the evolution of the value of the fit criteria as a function of a parameter of the building model, for an SAR image.

An illustration of the variations of the criteria $C_{region}$ and $C_{segment}$ is presented in FIGS. 5a (optical image) and 5b (SAR image), in the case of a given building, the lone height parameter of the building being variable and all the other parameters being fixed.

The first criterion $C_{region}$ based on the homogeneity of the regions is much smoother as indicated by the variations presented in the figure hereinabove (solid curves), but possesses wider attraction basins than the basins of the second criterion $C_{segment}$ based on segments (dashed curves).

In a fifth step 105, a test is executed to determine whether another building assumption should be tested, stated otherwise, whether another suite of parameters should be applied to the building model, in accordance with the second step 102. In the example, if the fit criteria used during the fourth step 104 have converged to optimal values, then the sixth step 106, described further on, is executed. In the converse case, a new cycle comprising the second step 102, third step 103 and fourth step 104 is executed.

In an implementation where all the assumptions were tested in an exhaustive manner, the result of the test 105 would be positive as long as the N-tuples had not yet been tested.

In a sixth step 106, the method performs a selection of the building assumption or assumptions considered to be correct. Stated otherwise, if certain projected building models fitted the image according to the criteria evaluated during the fourth step 104, then these models are considered to model buildings that are actually present in the image.

According to an implementation of the method according to the invention, only one occurrence of the parametrized building model is sought in the image. In this case, a single building is extracted from the image; this entails the building corresponding to the assumption whose fit with the radiometry of the image is the best.

According to another implementation of the method according to the invention, minimum fit thresholds are chosen for each of the fit criteria and all the assumptions corresponding to maxima of these criteria which exceed the thresholds are considered to be real buildings. If no suite of parameters makes it possible to obtain a level of fit greater than the thresholds, then it is considered that the building sought is not in the image.

Several buildings can thus be found in the image on the basis of a single parametric model. For example, if it is chosen to seek a house whose footprint is rectangular and which comprises a pitched roof and if the image comprises a plot comprising several homes of different dimensions and orientations, but all comprising a rectangular print and a pitched roof, then the method according to the invention will model each of the homes of the plot.

To summarize, the modelling method of FIG. 1 executes the following steps:
- choose a 3D parametric building model (first step 101);
- randomly draw according to uniform laws the parameters of the 3D model (second step 102);
- project the candidate building into the image 111 with the aid of the picture-capture model 112 so as to form the signature of the building (third step 103)
- optimization on the basis of the region criterion on the basis of these initial parameters (drawn at random on the basis of a uniform law), and then
- optimization on the basis of the criterion based on the segments on the basis of the first optimization (fourth step 104, fifth step 105 and second step 102);
- as long as, for example, a predetermined number of suites of parameters has not yet been drawn, return to the second step 102 of random drawing so as to initialize a new suite of parameters;
- determine the parameters leading to the best fit (sixth step 106).

This generation-optimization method may be iterated according to, for example, a method of Monte Carlo type. The random draws are repeated so as to render the optimizations more robust but a relatively small number of draws turns out to be sufficient. The optimization algorithm used may be a conventional gradient descent with linear search, where the gradient vector is calculated by simple finite differences.

Figure 2:
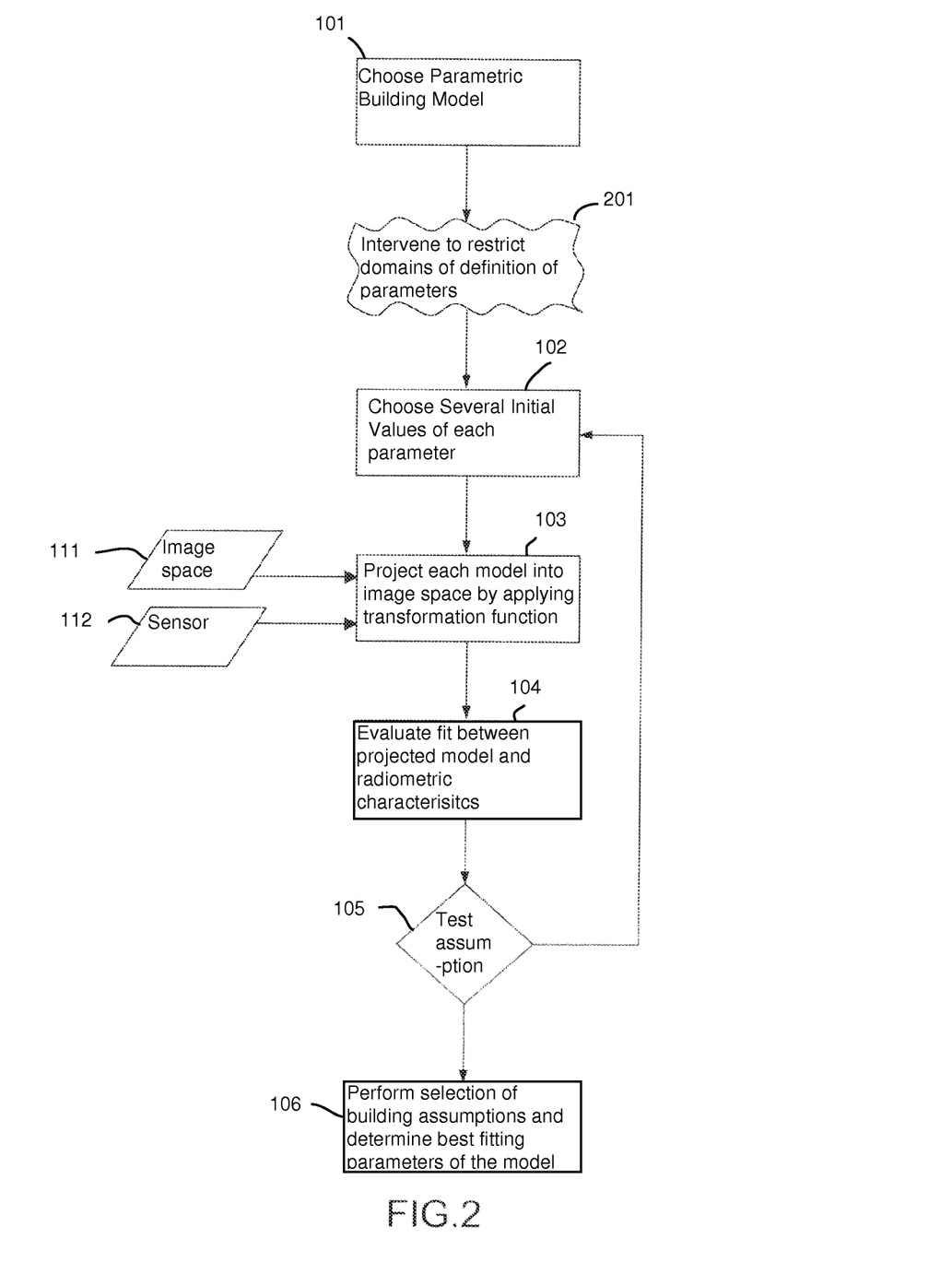
FIG. 2, a diagram illustrating the steps of a second implementation of the modelling method according to the invention.

FIG. 2 illustrates the steps of a second implementation of the modelling method according to the invention, in which a user intervenes to restrict the combinatorics involved in the method. Indeed, the space of assumptions may be significant since it extends over the cartesian product of all the domains of definition associated with each of the parameters of the model. Restricting the domain of definition of one or more parameters, or indeed fixing the value of these parameters, makes it possible to accelerate the execution of the method. For example, instead of taking into account the assumption according to which the height of the buildings can be between 3 and 40 m, the more restrictive assumption according to which the height of the buildings is between 3 m and 10 m will be considered.

The method may be executed on a calculation machine such as a computer provided with a screen on which the user can view the image. Thus, this user can, in a few elementary operations, limit the search space by taking account of his knowledge of the image. For example, he can exclude the geographical zones in which there are no buildings by cropping on the screen the relevant zones via input means such as a mouse.

This step 201 of restricting the domains of definition of the parameters may be executed between the first step 101 and the second step 102 described in FIG. 1.

Figure 3:
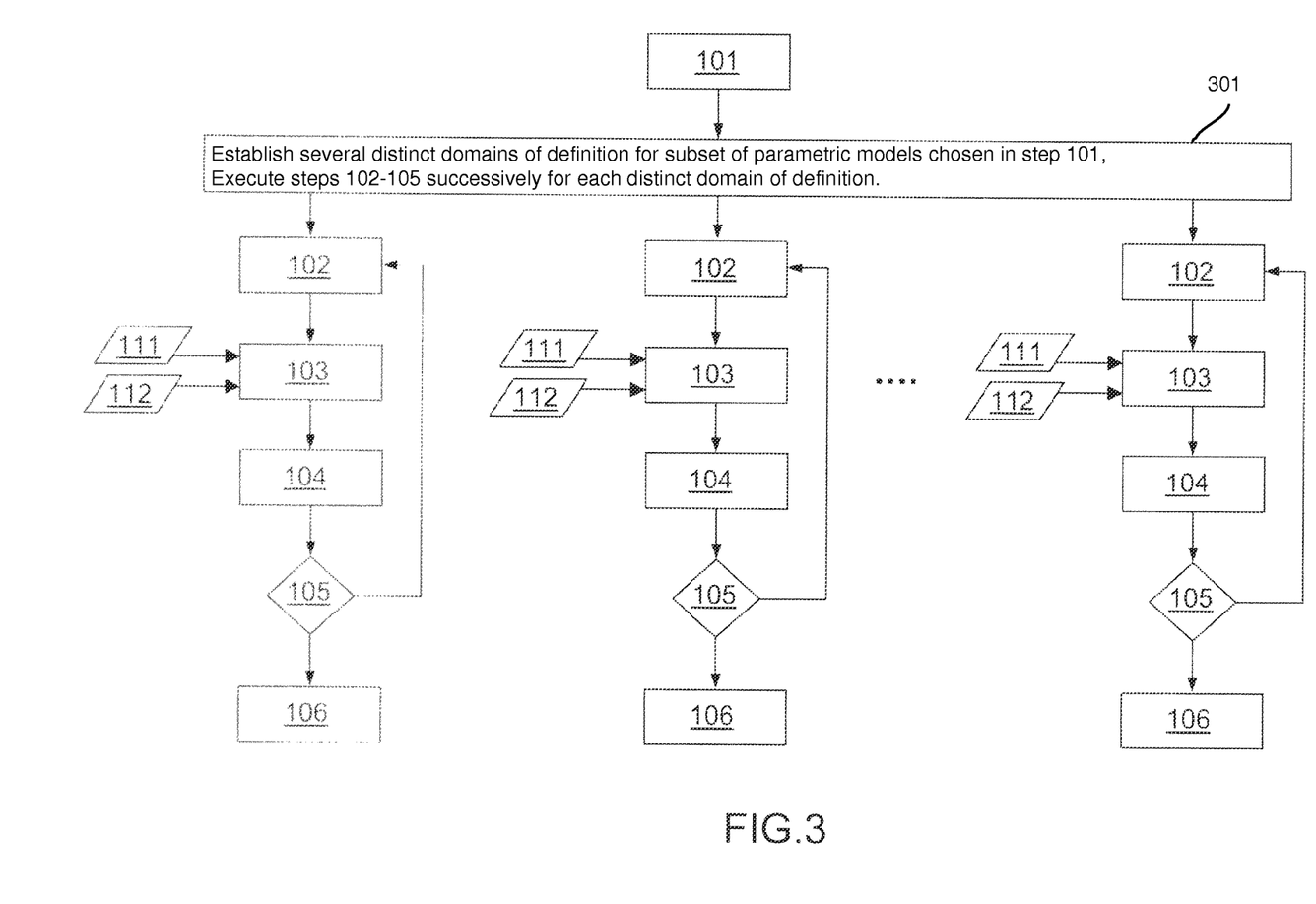
FIG. 3, a diagram illustrating the steps of a third implementation of the modelling method according to the invention.

FIG. 3 illustrates the steps of a third implementation of the modelling method according to the invention. According to this implementation, several distinct domains of definition 301 are established for a subset of parameters of the parametric model chosen during the first step 101, and then the second, third, fourth, fifth and sixth steps 102, 103, 104, 105, 106 are executed successively for each of these distinct domains of definition. For example, if two buildings are sought in an image, the first building being situated in a first zone of the image, and the second building being situated in a second zone of the image, two distinct domains of definition are created, each of these domains of definition covering latitudes and longitudes suited to the search zones. The domains of definition may be created manually, in accordance with the description of FIG. 2.

Figure 4:
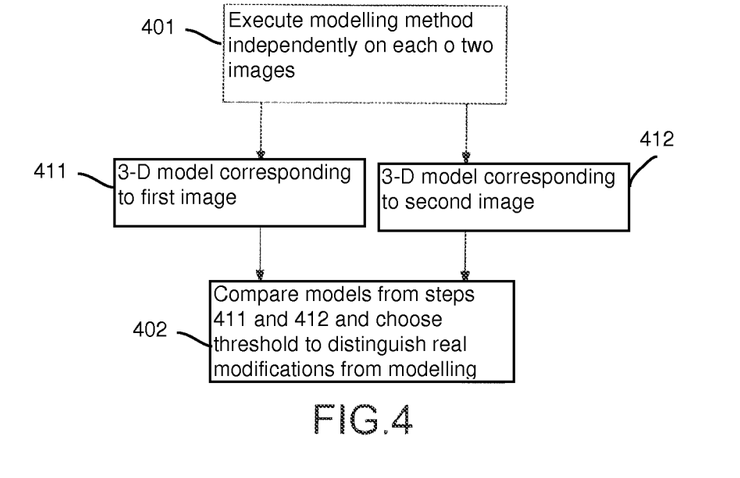
FIG. 4, a diagram illustrating the steps of a method of detecting change according to the invention.

FIG. 4 illustrates the steps of a method for detecting changes according to the invention. This method may be used to compare two images of one and the same geographical zone captured at different instants, for example two images of one and the same urban zone captured at an interval of a year apart. It makes it possible notably to detect the buildings which have been destroyed, constructed or modified. In the example described with regard to FIG. 4, two images are compared.

Firstly 401, a modelling method is executed independently on each of the two images. The modelling method is, for example, the method such as described above with regard to FIGS. 1 to 3. On completion of this step, two 3D models 411, 412 are produced, one model corresponding to each image.

Secondly 402, the two 3D models 411, 412 are compared. Accordingly, a mathematical distance may be created to measure the differences between two objects present in each of the models. Advantageously, a threshold is also chosen so as to distinguish the differences which correspond to real modifications on the terrain and those which are due only to inaccuracies in the modelling of the objects. This threshold will furthermore be able to be tailored as a function of the metadata associated with the images provided as input. For example, if the two images are captured with very different viewpoints, the threshold may be raised to avoid detecting false differences.

According to another implementation of the method for detecting changes, the method is firstly executed on an image, and then the building models extracted from this image are projected into the second image. The fit between these projections and the radiometric characteristics of the second image is thereafter tested.

An advantage of the method for detecting changes according to the invention is that it makes it possible to compare two images of different types (example: a panchromatic image with a multispectral image), in contradistinction to the conventional schemes based on radiometric comparisons between two optical images, for example.

Moreover, the modelling method according to the invention may advantageously be utilized to produce homologous points.

It is known that images of one and the same zone of the terrestrial surface may emanate from multiple sources and not be associated with a very precise picture-capture model. Mutual registration of these images is then desired so as to refine the georeferencing of the images, stated otherwise to improve the correspondence function for matching between the terrain points (referenced by geographical coordinates), and the image points (referenced by image coordinates, or pixels). The schemes for matching corresponding images require the determination of a large number of homologous points in the images. The homologous points are points present in each of the images which represent the same point of the imaged terrain. Given that the images are generally captured with different sensors and/or with different viewpoints, then the homologous points do not have the same coordinates in the images. For the sake of simplification, the term "registration" will be used subsequently to designate the schemes making it possible to extract homologous points of a group of aerial or space images representing one and the same zone of the terrestrial surface.

The registration may be carried out manually, automatically or according to a combination of manual actions and of automated methods. When the registration is manual, display means, for example a screen, are used to allow an operator to input the homologous points in each of the images directly with the aid of a mouse or similar means. This input turns out to be irksome and expensive, the operator having to choose a point of interest in one image, and then successively input precisely this point of interest in each of the other images. Moreover, certain types of images such as images of SAR type (the acronym standing for "Synthetic Aperture Radar") are very difficult for a human operator to interpret, which complicates the input of the homologous points, requires operators trained specifically for this type of image, and consequently increases the registration costs.

Certain automatic techniques have been proposed in order to accelerate extraction. Conventionally, a correlation-based scheme is employed, in which points termed points of interest, often radiometry extrema such as the Harris points or the SIFT ("Scale-Invariant Feature Transform") primitives are extracted. This scheme is inoperative when the images to be registered are of different natures, for example in the case of an optical image with an SAR image. The scheme described in the American patent published on 14 Jun. 2011 under the number U.S. Pat. No. 7,961,982 may notably be cited, which scheme extracts points of interest in each of the images so as to generate a function for transforming from one image to the other. However, the known automatic schemes operate correctly only with optical images, and do not therefore make it possible, as a general rule, to perform registration on the basis of images of SAR type. Moreover, in order for the results to be satisfactory, the viewpoints have to be close, in particular in the urban zones, where a small difference in viewpoint can lead to significant occlusions and to false correlations.

Certain automatic techniques are based on the prior extraction of segments, in particular for the processing of SAR images. Segments extracted from the various images are paired and homologous points are sought in these segments. However, this technique is prone to numerous errors, notably because of the imperfections in the detections of contours and in the difficulty of finding a particular point in a given segment. They require complex parametrization involving numerous thresholds to be fixed prior to the execution of the algorithm. Furthermore, a suite of parameters culminating in satisfactory results for a given image may turn out to be totally unsuited to other images; this problem is further increased for images of SAR type.

The method for extracting homologous points according to the invention makes it possible to register images with respect to one another, these images possibly emanating from picture-capture sensors of different types, having been captured at different dates and from different viewpoints.

The method is executed on a set of N images $I_1, \ldots, I_N$ associated with their georeferencing models $f_1, \ldots, f_N$, the images possibly being of heterogeneous natures (optical, SAR, multispectral or hyperspectral images, for example), N being greater than or equal to two. Each image emanates from a sensor onboard an aircraft or a satellite. The picture-capture model of the georeferenced image may be represented by a parametrized function, denoted $f_{\theta_1, \ldots, \theta_n}(X,Y,Z)$, matching up a 3D coordinate of the terrain space with a corresponding 2D coordinate on the image:

$$f_{(\theta_1, \ldots, \theta_n)}(X_{terrain}, Y_{terrain}, Z_{terrain}) = (\text{column}_{image}, \text{row}_{image})$$

where the parameters $\theta_1, \ldots, \theta_n$ depend on the physical characteristics of the sensor. These models are imperfect, or indeed sometimes unavailable and therefore replaced with generic models. Also, the models corresponding to each image are generally not consistent.

Figure 6:
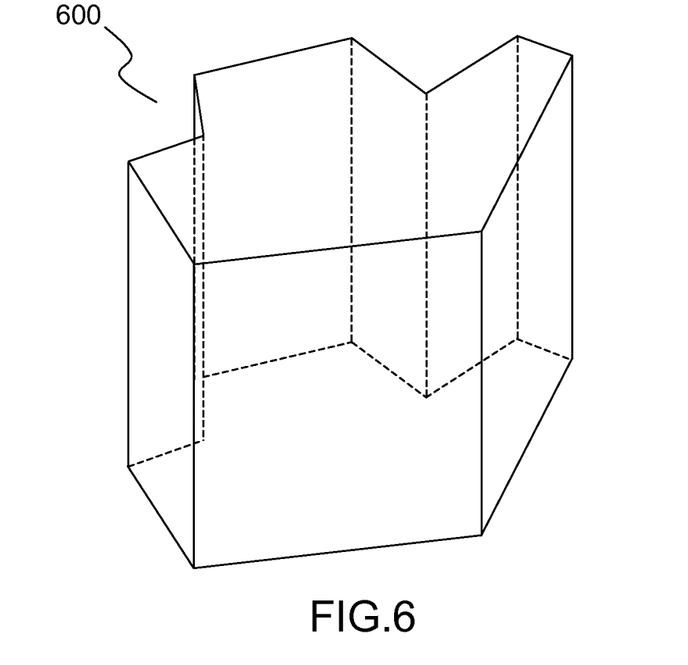
FIG. 6, a diagram representing an exemplary building model used by the method for extracting homologous points according to the invention.

The method according to the invention makes it possible to establish a plurality of N-tuples of points in image coordinates in the images 1 to N, each of these N-tuples marshalling the views of one and the same point of the terrain represented in each of the N images. For the creation of these N-tuples, the method uses the presence of buildings (or more generally of fixed objects of large size) in the images. In the example, it is assumed that these buildings may be modelled by extruded 3D models, that is to say right cylinders with polygonal base, which are defined by a horizontal polygon able to represent the roof and a height, as represented in FIG. 6. The examples presented subsequently use models of buildings for the registration, the buildings presenting notably the advantage of being fixed and of large size, but the method according to the invention can use the modelling of any real object whose dimensions are significant enough to appear on the image.

Figure 7:
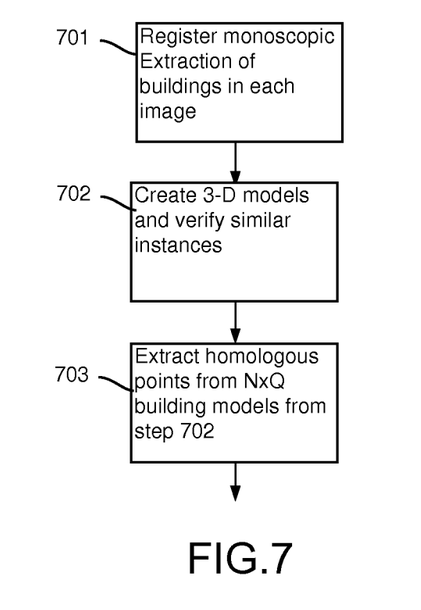
FIG. 7, a diagram presenting the steps of a method for extracting homologous points according to the invention.

As illustrated in FIG. 7, the matching method according to the invention comprises three main phases 701, 702, 703. The first phase 701 is a phase of monoscopic extraction of the buildings in each of the images to be registered. Stated otherwise, buildings are modelled in three dimensions in each of the images independently of the other images. This modelling may be performed manually, or form the subject of a partial or total automation. In the example, a semi-automatic method described hereinafter is employed. The K buildings to be extracted are denoted $B^k$, $k \in [1,K]$, the K×N models of these buildings to be created for the set of N images being denoted $b_i^k$, $k \in [1,K]$, $i \in [1,N]$.

Firstly, a human operator chooses a building whose presence he has detected in each of the N images. In each image, he designates with the aid of a pointer—for example with a computer mouse—the region which seems to contain the signature of the building, that is to say its representation in the image.

Secondly, in each of the regions pointed at, a 3D model of the building is reconstructed, either in an entirely manual manner—for example by complete input of the building by the operator—, or in a semi-automatic manner, or with the aid of a method for automatically reconstructing a 3D model of a building on the basis of a single image, that is to say a monoscopic modelling. The N images make it possible to construct N different 3D models $b_i^k$ of the same building $B^k$ (since the picture-capture models of these images are not necessarily consistent).

According to an implementation of the method according to the invention, in particular when extraction is entirely automatic, the first step of choosing the building to be modelled by an operator is not executed in the course of the first phase. Advantageously, when the monoscopic extraction is entirely automatic, the latter may be performed in the following manner, for each image independently:

choose a parametric model of the external surface of the building to be extracted;

for several suites of parameters of the said model:

project the parametrized model into the image by applying the physical picture-capture model available;

evaluate the fit between the projected model and the radiometric characteristics of the image;

determine the parameters of the model for which the fit is the best.

Thus, for each image, K suites of parameters defining K models of buildings are created and on completion of this first phase 701, N×K 3D models of buildings $b_i^k$, k∈[1,K], i∈[1,N] are created.

The second phase 702 makes it possible to select the instances of modelled buildings to be taken into account in the third phase 703 described further on. Indeed, certain models of buildings are too far from one image to the other to be able to be taken into account by the method in a reliable manner. For each building $B^k$, k∈[1,K] of the terrain, the second phase 702 therefore makes it possible to verify that the various 3D instances $b_i^k$ are sufficiently similar. When the various models created from one and the same building are considered to be too distant during this second phase 702, then the building is not used in the third phase 703 of the method according to the invention. This second phase 702 a filtering role, which is useful in particular when the viewpoints from which the various images originate are very different.

In the example, the building models are constrained to right cylinders with polygonal base. The model can therefore be defined by a polygon representing the roof and situated in a horizontal plane (therefore at constant altitude) and a value of height of the building. Other more complex models could be employed.

Let $B^k$ be a building and let i and j be the indices of two images on the basis of which the two 3D models $b_i^k$ and $b_j^k$ of this building are respectively constructed. Each of these models is defined, in the example, by a polygon and a height.

A first similarity criterion for the heights is optionally used. The similarity criterion for the heights $s_h$ is the relative difference between the two heights $h_i^k$ and $h_j^k$ of the building models $b_i^k$ and $b_j^k$ compared emanating from the two images i and j:

$$s_h(k, i, j) = \frac{|h_i^k - h_j^k|}{\max(h_i^k, h_j^k)}$$

If the similarity criterion $s_h(k,i,j)$ for the building $B^k$ extracted from images i and j is greater than a given threshold, the building $B^k$ is rejected. This building cannot be considered to be a linking building between the various images, that is to say a building taken into account in the third phase 703.

In the example, a second similarity criterion for the polygons is used in the course of this second phase 702. This criterion is based on the fact that the polygons corresponding to the same building in the various images must have the same number of vertices in order to be compared. If this is not the case, the building $B^k$ and therefore all its models $b_i^k$ for any index i are rejected by the second phase 702 of the method. It is considered that two models $b_i^k$ and $b_j^k$, extracted in two images i and j, of one and the same building $B^k$ possess a roof represented by polygons, respectively $p_i^k$ and $p_j^k$, which possess the same number of vertices, denoted n. The coordinates of the vertices of the polygons are for example expressed in a 2D cartesian frame. The assumption is made that the differences of georeferencing to be corrected of images i and j imply that polygons $p_i^k$ and $p_j^k$ differ by a transformation close to a similarity.

Consider the polygon $p_i^k$ and its vertices $M_i^k(1), \ldots M_i^k(n)$ considered in the right-handed sense of the plane and the polygon $p_j^k$ with its vertices $M_j^k(1), \ldots M_j^k(n)$. Let $\alpha^2$ be the ratio of the areas of the two polygons $p_i^k$ and $p_j^k$. We define the n 2D-similarities, denoted $sim_{i,j}^{k(l)\ for\ l}=1, \ldots$ n of ratio $\alpha$ which transform the isobarycentre of $p_i^k$ into that of $p_j^k$ and the vertices $M_i^k(l)$ into $M_j^k(l)$ for l=1 . . . n. The similarity criterion for the two polygons $p_i^k$ and $p_j^k$ is then defined by the minimum distance between $p_i^k$ and its images under the n similarities. More precisely:

$$s'_p(k, i, j) = \min_{l \in \langle 1, n \rangle} \sum_{m=1}^{n} \|M_j^k(m) - sim_{i,j}^k(l)(M_i^k(m))\|^2$$

If the similarity criterion $s'_p(k,i,j)$ for building $B^k$ extracted from images i and j is greater than a given threshold for a given pair of images (i,j), building $B^k$ may be rejected, and thus not be considered to be a linking building between the various images.

The aforementioned criteria are cited by way of example and could be replaced or supplemented by taking other criteria into account. On completion of the second phase 702, a set of N×Q out of the N×K building models is retained so as to be taken into account in the third phase 703 of the method according to the invention.

The third phase 703 is aimed in particular at extracting homologous points on the basis of the Q buildings emanating from the filtering effected during the second phase 702. In the example, the points of the roofs of the 3D models $b_i^k$ of buildings are matched, the roofs being modelled in the form of 2D polygons. This example is nonlimiting, and other schemes could be employed in order to choose the homologous points. For the sake of clarity, as a fixed building of index k is considered in the subsequent description of the third phase 703, the notation is simplified by omitting the indices k.

We consider a building and N images of this building which have made it possible to reconstruct N 3D-models $b_i$ of the building, one for each image indexed by i, the models being defined in the example by a height $h_i$ and a polygon $p_i$ in the plane representing its roof. It is assumed that all the polygons $p_i$ possess the same number of vertices fixed at n, n being greater than or equal to 3. Each polygon may be denoted as an ordered string of n points in the plane:

$$p_i = \langle M_i^1, \ldots, M_i^l, \ldots, M_i^n \rangle, l \in \langle 1 \ldots n \rangle$$

The third phase 703 is aimed at matching the n vertices of each 2D polygon so as to form, for the building considered, n N-tuples of points, these N-tuples being utilized subsequently to obtain the sets of homologous points sought. The difficulty with this matching is due in particular to the fact that the N images do not possess any consistent georeferencing. Indeed, if their georeferencing were consistent, the N 3D-models would be identical and the registration of these images would turn out to be unnecessary. The registration not being perfect, the N polygons of the plane are not identical, even if on completion of the second phase 702, they may be fairly similar according to the similarity criteria of this second phase 702.

In the example, the polygons similarity criterion used in the second phase 702 is reused in this third phase 703. If a single one out of the n possible similarities attains the minimum of the criterion $s'_p$, this similarity defines a unique circular permutation of the indices of the vertices of the polygon.

If this similarity is not unique, stated otherwise, if several out of the n possible similarities attain the minimum of the criterion $s'_p$, this being rare, it is necessary to choose "the best" in a sense defined hereinafter. An affine similarity is the compound of a homothety, of a translation and of a rotation. Two different polygons $p_i$ and $p_j$ emanating from the images i and j are considered, both possessing n vertices. By dispensing with the homothety factors and the translation between the two polygons (that is to say between their centre of gravity), the sought-after similarity reduces to a vector rotation. If this vector rotation minimizing the criterion among the n candidates is not unique, this signifies that the group of rotations which leave the polygon invariant is not reduced to the identity. Among the p≤n candidate rotations, we choose that for which the angle of rotation is the smallest modulo 2*pi in absolute value out of the p angles. This makes it possible to define the rotation, therefore the similarity in a unique manner.

Thus, for two given images with indices i and j, the third phase 703 makes it possible to associate a unique circular permutation matching each vertex of a first polygon modelling the roof of the building extracted from the first image i with a corresponding vertex of a second polygon modelling the roof of the same building extracted from the second image j. This scheme comprises notably the following two advantages. On the one hand it makes it possible to recognize the "appropriate" vertices even if the sought-after roofs have a nonzero symmetry group (like the regular polygons). Moreover, it makes it possible to define a unique correspondence which does not depend on the path traversed through the set of images. Stated otherwise, if $s_{i,j}$ denotes the circular permutation defined in the sense hereinabove, we have the following relation of the "Chasles relation" type: $s_{i,j} \circ s_{j,k} = s_{i,k}$, which guarantees the intrinsic character of the correspondences.

On the basis of the homologous points extracted, a registration of the images with respect to one another can thus be performed by schemes known to the person skilled in the art. For example, the picture-capture models may be tailored as a function of these homologous points.

The method according to the invention makes it possible to generate a significant number of N-tuples of homologous points if the building possesses a polygonal roof, even if this polygon is regular and therefore possesses a group of rotations which render it invariant which is not reduced to the identity. Thus, with this scheme, it is possible to produce homologous points in large number, even if they are not necessarily seen in certain images.

An advantage of the method for extracting homologous points according to the invention is that it does not require any complex adjustment of thresholds, which are generally sources of lack of robustness. In contradistinction to the methods customarily used in the prior art, the method according to the invention is therefore not dependent on the processed images.

An advantage of pairing homologous buildings is that it is possible to create homologous points, without the latter being seen in all the images to be matched. This is more particularly an advantage for the processing of the imaged zones in a dense urban environment, where the least change of viewpoint produces significant occlusions.

An advantage of the modelling method according to the invention is that it makes minimum assumptions about the radiometric and geometric nature of the images, thereby making it possible to obtain satisfactory results on very diverse image types.

The modelling method according to the invention can also be implemented independently on several images representing the same geographical zone, and then the modelling results obtained for each of the images may be combined to improve the reliability or the precision of the modelling.

The invention claimed is:

1. A method of modelling a real object represented in an image of a terrestrial surface, the image being referenced geographically and produced by an aerial or space sensor associated with a physical picture-capture model, the method being executed on a calculation machine and comprising at least the following steps:
   choosing, using the calculation machine, a parametric model of an external surface of the real object;
   choosing, using the calculation machine, several initial suites of parameters of the said parametric model and for each of the initial suites of parameters:
      projecting the parametric model into the image by applying the physical picture-capture model;
      evaluating, according to predefined radiometric criteria, a fit between the projected model and the image;
      modifying the parameters by an optimization scheme based on the radiometric criteria, and repeating, with the parameters modified by the optimization, the method from the step of projecting the parametric model, until an optimal suite of parameters emanating from the initial suites of parameters is found, the method further comprising;
      optimising the suite of parameters by using first a radiometric criterion based on a calculation of a radiometric homogeneity of constituent regions of the model projected into the image, and
      then another radiometric criterion based on a calculation of a fit of contours of the model projected into the image with contours present in the image,
   determining, from among the said optimal suites of parameters determined, the parameters of the model for which the fit is the best, so as to model the said object with these parameters,
   wherein the method is a monoscopic modelling method of modelling a real object represented in the image of the terrestrial surface.

2. The modelling method according to claim 1, wherein the initial suites of parameters are randomly selected.

3. The modelling method according to claim 2, wherein each of the parameters in the initial suites of parameters is randomly selected according to a law of probability having a uniform distribution in its domain of definition.

4. The modelling method according to claim 1, further comprising a method of modelling several real objects represented in the geographically referenced image of the terrestrial surface, the image being produced by an aerial or space sensor, wherein the step of choosing the parametric model is executed according to claim 1, and wherein several distinct domains of definition are defined, for a subset of parameters, before executing the steps according to claim 1 of projection, of evaluating a fit between the projection of the parametric model and the image, and of determining the parameters for which the fit is a best fit on each of the previously defined domains of definition.

5. The modelling method according to claim 1, the method being implemented by software executed on the calculation system provided with means of display and of interaction with a user, in which, after the step of choosing the parametric model according to claim 1, a user defines, by using the interaction means, a domain of definition for a subset of parameters, before executing the steps of projection, of evaluating a fit between the projection of the parametric model and the image, and of determining the optimal parameters over the domain of definition defined previously by the user.

6. The modelling method according to claim 1, the method being adapted for detecting changes between two images of the same geographical zone captured at two different instants, the method comprising a first step of executing the modelling method according to claim 1 on each of the two images, and a second step of comparing the models obtained on completion of the first step.

7. A system for modelling a real object represented in an image of a terrestrial surface, the image being referenced geographically and produced by an aerial or space sensor, wherein the system comprises at least the calculation machine configured to execute the modelling method according to claim 1.

8. A method for extracting at least one group of N homologous points on the basis of N aerial or space images referenced geographically in an approximate manner, N≥2, the images representing one and the same zone of a terrestrial surface, the homologous points of the same group corresponding to the same geographical point in the said zone, each of the homologous points of the said group being defined by coordinates in a different image, the method comprising the following steps:

for each of the N aerial or space images, modelling, using a calculation machine, an external surface of K real objects represented in the image, K≥1 by:

choosing a parametric model of an external surface of the said real object;

choosing several initial suites of parameters of the said parametric model and for each of the said initial suites of parameters:

projecting the parametric model into the image by applying the physical picture-capture model;

evaluating, according to predefined radiometric criteria, a fit between the projection of the parametric model and the image;

modifying the parameters by an optimization scheme utilizing the said radiometric criteria, and repeating, with the said parameters modified by optimization, the method from the step of projecting the model, until an optimal suite of parameters emanating from the said initial suite of parameters is found, comprising:

optimising the suite of parameters first by using a radiometric criterion based on a measurement of a radiometric homogeneity of constituent regions of the model projected into the image, and then another radiometric criterion based on a measurement of a fit of contours of the model projected into the image contours present in the image;

determining, from among the said optimal suites of parameters determined, the parameters of the model for which the fit is the best, so as to model the said object with these parameters;

selecting from among the K real objects, Q objects, Q≤K, for each of which the N models created during the modelling step are at a distance less than a predetermined distance, for each of the Q objects, choosing at least one point in each of the N models of this object, and determining in each of the N aerial or space images, the coordinates corresponding to the chosen points, the set of the coordinates forming one of the said groups of N homologous points.

9. The method for extracting at least one group of N homologous points of claim 8, wherein the external surface of the K real objects being modelled in three dimensions by means of edges and vertices, in which for each of the Q objects selected, the homologous points are chosen from among the said vertices.

10. The method for extracting at least one group of N homologous points of claim 8, a first model of one of the modelled K real objects being generated on the basis of a first image, a second model of the same one of the K real objects being generated on the basis of a second image, wherein a step of matching the vertices of each of the two models is executed prior to the step of choosing the homologous points.

11. The method for extracting at least one group of N homologous points of claim 8, wherein each of said images is produced by an aerial or space sensor associated with a physical picture-capture model, the method further comprising a step of correcting the said picture-capture models as a function of the groups of homologous points extracted.

12. A system for registering images, wherein the system comprises the calculation machine configured to execute the method according to claim 8.

* * * * *